United States Patent [19]

Williams et al.

[11] 4,268,533

[45] May 19, 1981

[54] QUICK-SET LOW METHOXYL PECTIN COMPOSITION

[75] Inventors: Richard A. Williams, Putnam Valley; Andre J. Eydt, New York; Charles E. Lambert, Dobbs Ferry; Michael T. McGuire, Elmhurst; Walter W. Schulok, Stony Point; Reuben H. Waitman, Pearl River, all of N.Y.

[73] Assignee: General Foods Corporation, White Plains, N.Y.

[21] Appl. No.: 96,590

[22] Filed: Nov. 21, 1979

[51] Int. Cl.³ .............................................. A23L 1/06
[52] U.S. Cl. .................................... 426/577; 426/97; 426/271
[58] Field of Search ................. 426/577, 548, 804, 97, 426/271

[56] References Cited

U.S. PATENT DOCUMENTS

| | | | |
|---|---|---|---|
| 2,334,281 | 11/1943 | Olsen et al. | 426/577 |
| 2,524,416 | 10/1950 | Baker et al. | 426/250 |
| 2,559,338 | 7/1951 | Barch | 426/577 |
| 2,673,157 | 3/1954 | Shepherd et al. | 426/577 |
| 2,701,767 | 2/1955 | Twieg et al. | 426/97 |
| 2,784,099 | 3/1957 | Block et al. | 426/548 |
| 2,809,893 | 10/1957 | Poarch et al. | 426/576 |
| 2,809,894 | 10/1957 | Poarch | 426/577 |
| 2,824,007 | 2/1958 | Leo et al. | 426/577 |
| 2,856,288 | 10/1958 | Peekles | 426/285 |
| 2,865,761 | 12/1958 | Leo et al. | 426/548 |
| 2,910,365 | 10/1959 | Olliver | 426/577 |
| 3,041,179 | 6/1962 | Lister et al. | 426/577 |
| 3,140,186 | 7/1964 | Bender et al. | 426/577 |
| 3,365,305 | 1/1968 | Hunter | 426/564 |
| 3,367,784 | 2/1968 | Waitman et al. | 426/577 |

OTHER PUBLICATIONS

Pectin; L. M., Sunkist Growers Inc., Ontario, CA, 1953.

Primary Examiner—Jeanette M. Hunter
Attorney, Agent, or Firm—Mitchell D. Bittman

[57] ABSTRACT

A cold water-soluble quick-setting low methoxyl pectin dry mix composition providing smooth, continuous and uniform gels having good texture and mouth-feel characteristics is prepared by combining a low methoxyl pectin which has been co-dried with a protective amount of buffer and a solubilizing amount of sugar with a slowly soluble calcium ion source in an amount sufficient for gel formation and a slowly dissolving edible acid in an amount which will provide a final pH of from about 3.5 to 4.5 upon dissolution of the mix in water.

22 Claims, No Drawings

QUICK-SET LOW METHOXYL PECTIN COMPOSITION

BACKGROUND OF THE INVENTION

1. Field of the Invention

This invention relates to the field of pectin gels and more particularly, to such gels based on low methoxyl pectin.

2. Description of the Prior Art

For many years, gelatin desserts have enjoyed universal popularity due to a combination of appealing taste and texture characteristics and relative ease of preparation. Typically, a quantity of dry gelatin mix is dissolved in a given amount of hot water to provide complete dissolution of the gelatin, a like amount of cold water is then added to the dissolved mix to satisfy the full water requirements of the mix and the resulting warm dissolved gelatin solution is chilled for several hours to allow the gelatin to set. There has long been a desire to provide a gelatin dessert in quick-gel form. Such a product would not have to be prepared hours in advance as with the gelatin compositions now available, but could be made ready for consumption within minutes and in response to unanticipated needs. However, the basic physical and chemical properties of gelatin, a protein obtained from animal skin, tendons, ligaments, bones, etc., has so far resisted fully successful attempts toward instantization.

Pectin has been the focus of many studies designed to provide cold water-soluble quick-set edible gels. Pectin is a gellable substance, derived from fruits and vegetables which structurally is partially methoxylated polygalacturonans built up from D-galacturonic acid units forming long chain-like molecules. The pectin is available in two forms, each of which gels by a different mechanism, that is a high methoxyl (HM) type having a degree of methoxylation (DM), or ratio of methoxylated galacturonic acid groups to total acid groups of 50% or above, and a low methoxyl (LM) type having a DM of less than 50%. One method of producing an LM pectin involves reacting methoxyl groups with ammonia to form amide groups. The resulting pectin usually contains from about 2.5 to 4.5% methoxyl groups by weight as compared to the HM pectin which generally contains from 8–14% methoxyl groups by weight. HM pectin requires a sugar or soluble solid content of approximately 55% by weight or higher and a pH of about 3.0–3.2 to achieve set. When the methoxyl ester content of LM pectin goes below about 7%, the pectin loses its ability to form sugar-acid gels as in the HM pectin, but acquires the ability to form gels through crosslinking of the carboxyl groups on neighboring adjacent pectin molecules or chains in the presence of polyvalent calcium ions. However, the very ease with which LM pectin undergoes irreversible gel formation in the presence of polyvalent calcium ions has inhibited its widespread use in the food industry. The calcium salt which provides the ions effecting gel formation dissolves and ionizes in cold water at a considerably faster rate than the rate of dissolution of the LM pectin causing premature gelation of the pectin before all the pectin has had an opportunity to dissolve. The resulting product will either fail to gel, or if a gel is formed it will be non-continuous and possess an entirely unacceptable gritty or lumpy texture. As a result, in comparison to HM pectin, only a small amount of LM pectin is now being used in food products. Due to its functional properties and its ability to set in the presence of polyvalent calcium ions and without the addition of sugar, LM pectin is used in a variety of food products requiring a gelled texture such as fruit toppings, ice cream and novel dessert preparations. But because of its high calcium ion sensitivity, poor solubility and difficult method of preparation, LM pectin has thus far enjoyed only limited use.

Attempts have been made to overcome the problem of premature gelation associated with the LM pectin by using slowly or slightly soluble calcium salts (e.g., calcium phosphate or sulfate) in the presence of monovalent metal ions such as those of sodium (e.g., provided by sodium citrate) which can retard the rate of crosslinking sufficiently to permit dissolution of the pectin as proposed in *Pectin L.M.* (Sunkist Growers Inc., 1953). U.S. Pat. No. 2,701,767 describes the coating of the calcium salt particles to reduce their rate of dissolution as well as co-drying of the pectin with a monovalent metal salt such as sodium citrate to delay gel formation. U.S. Pat. No. 2,559,338 provides a method for ensuring the solution of at least a substantial quantity of LM pectin before appreciable solution of calcium salt occurs by dissolving a soluble edible acid such as citric, malic, tartaric, fumaric or ascorbic acid with each calcium salt particle at the same time and place in the gel-forming solution. Methods of increasing the rate of solubility of LM pectin in cold water to approach that of the calcium salt are described in U.S. Pat. Nos. 2,673,157 and 2,856,288. According to these methods, the pectin is co-dried with sugars such as lactose, sucrose, dextrose, etc., to accelerate dissolution.

U.S. Pat. No. 3,041,179 provides an HM pectin (60–73% DM) dry mix containing a dispersant, fruit acid and adipic acid. U.S. Pat. No. 3,140,186 discloses an HM pectin (72–75% DM) dry mix combined with adipic acid for improved flowability. The gel composition of U.S. Pat. No. 3,367,784 employs an LM pectin (25–35% DM), a source of calcium ions, a source of ions of another alkaline earth metal, preferably magnesium, an edible acid, buffer or solubilizer, flavor, color and preservative. The gel is prepared by dispersing a first component containing the pectin in cold water and heating the water to complete dissolution of the pectin, dissolving a second component containing the source of calcium ions in hot water and combining the two hot solutions. Other gel-forming LM pectin compositions are described in U.S. Pat. Nos. 2,524,416; 2,784,099; 2,809,893; 2,809,894; 2,824,007; and 2,910,365.

None of the foregoing pectin gel dry mix compositions are provided as a single packet system which can be conveniently and rapidly converted to a smooth gel of appetizing flavor and texture characteristics by the dissolution of the same in cold or ambient temperature water with varying water hardness.

SUMMARY OF THE INVENTION

In accordance with the present invention, a dry mix LM pectin composition is provided which is converted to an edible quick-set smooth, uniform and continuous gel, free from grit and localized agglomeration upon dissoluton in cold to ambient temperature tap water. The dry mix composition comprises (a) an LM pectin which has been co-dried with a protective amount of a buffer with a monovalent cation and a solubilizing amount of readily soluble carrier such as sugar; (b) a source of slowly soluble calcium ions in an amount sufficient for gel formation; and, (c) a slowly dissolving edible acid in an amount which will provide a pH of from about 3.5 to about 4.5 upon dissolution of the mix in water. Optional ingredients with which the aforesaid dry mix compositions can be formulated include flavors, natural or artificial sweeteners, colors, preservatives, dried fruits and/or vegetables, etc.

The gelling mechanism is believed to be as follows. As the acid component (c) slowly dissolves, the pH of the solution decreases, becoming increasingly acidic. The pectin molecule, protected by the buffer and soluble and fast dispersing due to being co-dried with a readily soluble carrier, begins to disperse, then solubilize. As the pH decreases the pectin continues to solubilize and within the pH range of from about 3.5 to about 4.5, substantially all of the pectin will be dissolved and within this pH range the protective buffer is released. The calcium source is slowly soluble and the ionization of the calcium source (b) is retarded at the higher pH's and fully ionizes within the pH range of 3.5 to 4.5 after substantially all of the pectin is solubilized and effects crosslinking of neighboring pectin carboxylic acid groups. Gel formation readily occurs within a temperature range of from about 40° F. to about 85° F. (about 5° C. to 30° C.) over a period of time typically amounting to about 15 minutes or less. The resulting gel is continuous, smooth, uniform and possesses a good appearance and acceptable texture and mouth-free characteristics, without a lumpy or gritty texture.

DESCRIPTION OF THE PREFERRED EMBODIMENTS

The pectin employed herein is of the low methoxyl type, i.e., possesses a degree of methoxylation (DM) less than 50% and advantageously possesses a ratio of methoxylated galacturonic groups to total acids groups (DM) of from about 25% to about 35%. Expressed in another manner, the percent of free carboxy groups should be within the range of 12–20% of the total number of carboxy groups, methoxy groups, etc., in the pectin molecule.

Alternatively stated, such low methoxyl pectin suitable for use herein should possess a methoxyl content of below about 7%, preferably within the range of from about 2.5% to about 6.5% and most preferably within the range of from about 4.0 to about 5.0%, based upon the total weight of the pectin. Such pectin can be obtained by any one of several known and conventional methods, such as that described in U.S. Pat. No. 2,480,710, and is commercially available. Pectin having a methoxyl content less than about 2.5% is generally undesireable due to its tendency to precipitate calcium pectinate. Pectin having a methoxyl content of 7% or higher requires larger quantities of solids, typically sugar, to form a gel and is usually unsatisfactory from a texture or taste point of view.

The invention contemplates the use of a buffer with a monovalent cation to be codried with the LM pectin to protect the pectin molecule during dissolution of the dry mix composition in water against calcium ions present in the water (e.g. hard water) as well as from the calcium ion source, which would cause premature and localized gelation resulting in a non-continuous gel. The protective buffer ties up the reactive sites of the pectin molecule and allows substantially all of the pectin to solubilize before the pH descends sufficiently to release the buffer and ionize the calcium source which results in calcium cross linking with the LM pectin to form the gel. Suitable buffers with a monovalent cation include sodium and potassium phosphates as, for example, tetrasodium pyrophosphate, sodium acid pyrophosphate, trisodium phosphate, sodium hexametaphosphate, and sodium and potassium citrates, acetates, tartrates, malates, fumarates, adipates and ascorbates. Of these, trisodium citrate is especially preferred due to its unique ability to provide optimum protection of the LM pectin.

The level of buffer need be sufficient to protect the LM pectin from the calcium ions present in the water in which the pectin composition is reconstituted (e.g. hard water with up to 500 ppm of calcium carbonate), as well as protect the LM pectin from the calcium ions initially released from the calcium ion source. The level of a buffer, such as trisodium citrate, is preferably maintained within the range of about one to four parts by weight of pectin per one part by weight of buffer. A unique and surprising result of the instant invention is that the same formulation can provide a one step quick-set gel which is smooth, uniform and continuous regardless of the hardness of the water used to reconstitute the dry mix composition, i.e. with water having from 0 to 500 ppm of calcium carbonate (0 to 200 ppm of calcium ions). Thus the same formulation can be used in different geographical areas regardless of the variations in water hardness. An additional amount of buffer may be desired in the dry mix composition to obtain and maintain a final desired pH of the reconstituted mix within the range of about 3.5 to 4.5, preferably about 3.8 to 4.2. This additional amount of buffer will be adjusted according to the amount and type of acid, calcium source and LM pectin.

The LM pectin is co-dried with the readily soluble carrier to render the LM pectin more soluble and fast dispersing in cold or room temperature water (e.g. 40° F. to 85° F., or 5° C. to 30° C.). The prefered readily soluble carrier is sugar, with the type or amount of sugar employed not being especially critical as it is merely necessary to use only as much sugar as is necessary to provide a suitably solubilized LM pectin. The level of a readily soluble carrier, such as sugar, is preferably maintained within the range of about ten to twenty parts by weight of sugar per one part by weight of pectin. Sugars such as sucrose, dextrose, lactose, maltose, fructose, and the like, and their mixtures, can be employed. Further, syrups of such sugars can be used if desired to provide ease of handling during manufacture. Other readily soluble carriers include carbohydrates such as starches, gums, corn syrup solids, malto dextrins, etc., may also be employed, preferably in combination with the sugars. An additional amount of a dispersing agent, such as sugars or carbohydrates, can be blended into the formulation of the dry mix composition to aid in the dispersion of the ingredients of the dry mix composition, as well as to provide sweetness, depending upon the resultant reconstituted composition desired. The level of a dispersing agent, such as sugar, is preferably maintained within the range of about ten to twenty parts by weight of sugar per one part by weight of pectin.

The calcium ions can be provided by any slowly soluble, edible, inorganic or organic calcium salt, oxide or hydrated oxide. Calcium salts, however, are preferred and among those which can be employed are calcium carbonate, calcium sulfate, monocalcium phosphate, dicalcium phosphate, tricalcium phosphate, calcium chloride, calcium propionate, calcium malate, calcium citrate, calcium lactate, and the like. The level of calcium ions for gel formation should ordinarily be maintained within the range of about 0.015 to about 0.048 parts by weight of calcium ions per one part by weight of pectin. The calcium ion source can be naturally slowly soluble or can be rendered slowly soluble by control of granulation size, by coating or encapsulation, etc. The preferred source of calcium ions is a slowly soluble calcium salt such as anhydrous dicalcium phosphate.

A chelating agent, such as the disodium salt of ethylenediaminetetraacetic acid (EDTA) or sodium hexametaphosphate, may also be added to the formulation to sequester the calcium and other metallic ions present in the water used during dissolution of the dry mix composition and to prevent the metallic ions from prematurely combining with the LM pectin. Below about pH 5 the EDTA will release the calcium ion allowing it to react with the pectin to form the gel. The use of a chelating agent can reduce the amount of buffer needed to protect the LM pectin against hard water, however, in the preferred embodiment a chelating agent is not employed.

The slowly dissolving acid component of the dry mix composition can be selected from edible organic and inorganic acids such as citric, malic, tartaric, fumaric, adipic and ascorbic acid, and mixtures thereof. Of these, adipic and fumaric acids are especially preferred due to their slow solubility. The acid component can be naturally slowly dissolving (e.g. adipic or fumaric acid), or can be rendered slowly dissolving by controlling granulation size, by coating or encapsulation, etc. The amount of acid employed is such as to give a final pH in the gel composition between about 3.5 and about 4.5 and preferably, about 3.8 to about 4.2. The actual amount of acid is dependent upon the amount and type of LM pectin, calcium source and buffer, as well as the flavor desired. Preferably, the level of an acid such as adipic acid, is maintained within the range of about two to six parts by weight of acid per one part by weight of a buffer, such as trisodium citrate. The acid component is slowly dissolving to enable substantially all of the pectin to solubilize while the pH is being decreased to the level where the protective buffer is released and the calcium source is ionized. In effect, the slowly dissolving acid enables the pectin to solublize while controlling the ionization of the calcium source.

The co-drying of the pectin with a protective amount of buffer and a solubilizing amount of a readily soluble carrier constitutes an essential aspect of this invention. Advantageously, the aqueous solution of pectin, buffer and readily soluble carrier (e.g. sugar) should be co-dried under relatively mild conditions so as to minimize degradation of the pectin molecule and maximize solubility of the pectin in water as cold as about 40° F. (about 5° C.). Of the various drying techniques which have been evaluated herein, such as freeze-drying, spray-drying, vacuum tray drying, and vacuum drum drying, optimum results have been achieved by low-temperature drying by, for example, employing a Filtermat Dryer (Damrow Company, Fond du Lac, Wis.) in which a primary supply of hot air is used to almost completely dry a downwardly directed aqueous spray of dissolved pectin/buffer/sugar (e.g. sucrose and lactose) which impinges upon a continuously moving belt. The temperature of the primary hot air supply can range from about 120° F. to about 150° F. (about 50° C. to 60° C.) to provide entirely acceptable results. Drying temperature ranges for this and other drying techniques can extend considerably below or above the foregoing ranges provided due regard is given to maintaining the integrity of the LM pectin molecule. As the partially dried material is carried by the belt through the dryer, it progressively passes through an agglomeration and instantizing zone, a bed drying secondary zone provided with a secondary warm air supply and finally through a cooling zone provided with a cool dehumidified air supply, emerging therefrom in the form of a dry powder.

To maintain the integrity of the LM pectin and maximize solubility it is preferred to maintain the pectin at temperatures below about 140° F. (about 60° C.) during drying. The aqueous solution of pectin, buffer and carrier (e.g. sugar) can be prepared with deionized or soft water (low calcium ion content), it being preferred to use only as much water as is necessary for complete dissolution (e.g. about 50% solids). After co-drying, the component is then ground to a size preferably wherein the particles pass through a 40 mesh sieve U.S. Standard but are retained on a 180 mesh sieve U.S. Standard, and optimally wherein the particles pass through a 60 mesh sieve U.S. Standard but are retained on a 120 mesh sieve U.S. Standard. This particle size ensures optimum dispersability and solubility of the pectin.

Upon dissolution (reconstitution), and stirring of the dry mix LM pectin composition with tap water at temperatures of about 40° F. to 85° F. (about 5° C. to 30° C.), a smooth continuous and uniform gel is obtained which is ready to eat in 10 to 15 minutes and is free from grit and localized agglomeration.

In accordance with the invention herein, the following single packet dry mix compositions were prepared:

| Ingredient | Weight % | |
| --- | --- | --- |
| | Formulation I | Formulation II |
| Sucrose | 85.0 | 87.1 |
| Adipic Acid | 5.2 | 3.5 |
| LM Pectin (DM of 29%) | 3.5 | 3.5 |
| Lactose | 3.2 | 3.2 |
| Trisodium Citrate | 1.7 | .9 |
| Anhydrous Dicalcium Phosphate | .4 | .4 |
| Disodium EDTA | — | .4 |
| Flavor/Color | 1.0 | 1.0 |
| Total | 100.0 | 100.0 |

In the preparation of Formulations I and II, approximately 50% of the sucrose, and all of the LM pectin, lactose and trisodium citrate were co-dissolved in a minimum amount of deionized water (50% solids) and dried in the Damrow Filtermat Dryer at a primary hot air supply temperature of about 130° F. (55° C.). The co-dried component emerging from the dryer was then ground and sieved to a size wherein the particles passed through a 60 mesh U.S. Standard Sieve but were retained on a 120 mesh U.S. Standard Sieve. The ground component was then combined with the remaining ingredients of each formulation.

An LM pectin dessert was prepared by combining 85 grams of the dry mix composition with 2 cups (473 ml) of room temperature (70° to 80° F., 20° to 30° C.) tap water (400 ppm calcium carbonate) and mixing until the mixture started to thicken, after which it was poured into dishes and within 15 minutes was ready to eat. The dessert gels prepared from each of the formulations compared favorably in gel strength, mouthfeel, texture, appearance and flavor with a conventional gelatin gel preparation. The gel was smooth, continuous, uniform and free from a gritty or lumpy texture. As well, the resultant gel held its shape and was resilient without being adhesive or sticky.

The ingredients of the above formulations were also simply dry blended together without co-drying the sucrose, LM pectin, lactose and trisodium citrate. Upon dissolution of this dry mixture with room temperature tap water (400 ppm calcium carbonate) no gelation occurred because as the outside surface of the pectin particles dissolved, the pectin combined with the calcium forming insoluble particles which precipitated.

What is claimed is:

1. A single packet dry mix low methoxyl pectin composition which is convertible to an edible, quick-setting smooth, uniform and continuous gel, free from grit and localized agglomeration upon dissolution in cold or ambient temperature water of varying water hardness which comprises:
   (a) a low methoxyl pectin which has been co-dried with an amount of a buffer with a monovalent cation effective to protect the pectin from calcium ions present in the water and in the dry mix and a solubilizing amount of a readily soluble carrier;
   (b) a slowly soluble calcium ion source in an amount sufficient for gel formation; and,
   (c) a slowly dissolving edible acid in an amount which will provide a final pH of from about 3.5 to about 4.5 upon dissolution of the mix in water.

2. The dry mix of claim 1 wherein the readily soluble carrier is a sugar.

3. The dry mix of claim 1 wherein the ratio of methoxylated galacturonic acid groups to total acid groups is within the range of about 25% to 35%.

4. The dry mix of claim 1 further comprising an additional amount of the buffer to maintain a desired pH.

5. The dry mix of claim 1 further comprising a dispersing agent.

6. The dry mix of claim 1 or 4 wherein the buffer is trisodium citrate.

7. The dry mix of claim 1 wherein the slowly dissolving acid is adipic acid.

8. The dry mix of claim 2 wherein the sugar is a mixture of sucrose and lactose.

9. The dry mix of claim 1 wherein the source of calcium ions is anhydrous dicalcium phosphate.

10. The dry mix of claim 5 wherein the dispersing agent is a sugar.

11. The dry mix of claim 1 further comprising at least one member of the group consisting of flavor, color, sweetener, preservative, dried fruit and dried vegetable.

12. The dry mix of claim 1 or 3 wherein the pectin, the buffer and the readily soluble carrier are co-dried by low temperature drying which maintains the temperature of the pectin below about 140° F.

13. The dry mix of claim 1 wherein the co-dried pectin, buffer and carrier are ground to a size wherein the particles pass through a 40 mesh U.S. Standard Sieve, but are retained on a 180 mesh U.S. Standard Sieve.

14. The dry mix of claim 12 wherein the co-dried pectin, buffer and carrier are ground to a size wherein the particles pass through a 60 mesh U.S. Standard Sieve, but are retained on a 120 mesh U.S. Standard Sieve.

15. The dry mix of claim 11 further comprising a chelating agent.

16. The dry mix of claim 15 wherein the chelating agent is the disodium salt of ethylenediaminetetraacetic acid.

17. The dry mix of claims 1, 4 or 7 wherein the final pH upon dissolution of the mix in water is from about 3.8 to 4.2.

18. The dry mix of claim 6 wherein the by weight ratio of pectin to buffer is within the range of about 1:1 to 4:1.

19. The dry mix of claim 1, 2 or 8 wherein the by weight ratio of readily soluble carrier to pectin is within the range of about 10:1 to 20:1.

20. The dry mix of claim 5 or 10 wherein the by weight ratio of dispersing agent to pectin is within the range of about 10:1 to 20:1.

21. The dry mix of claim 1, 4 or 7 wherein the by weight ratio of acid to buffer is within the range of about 6:1 to 2:1.

22. The dry mix of claim 1 or 9 wherein the by weight ratio of calcium ions to pectin is within the range of about 0.015:1 to 0.048:1.

* * * * *